J. M. SMITH.
BUTTER WORKER.
No. 19,103.  Patented Jan. 12, 1858.
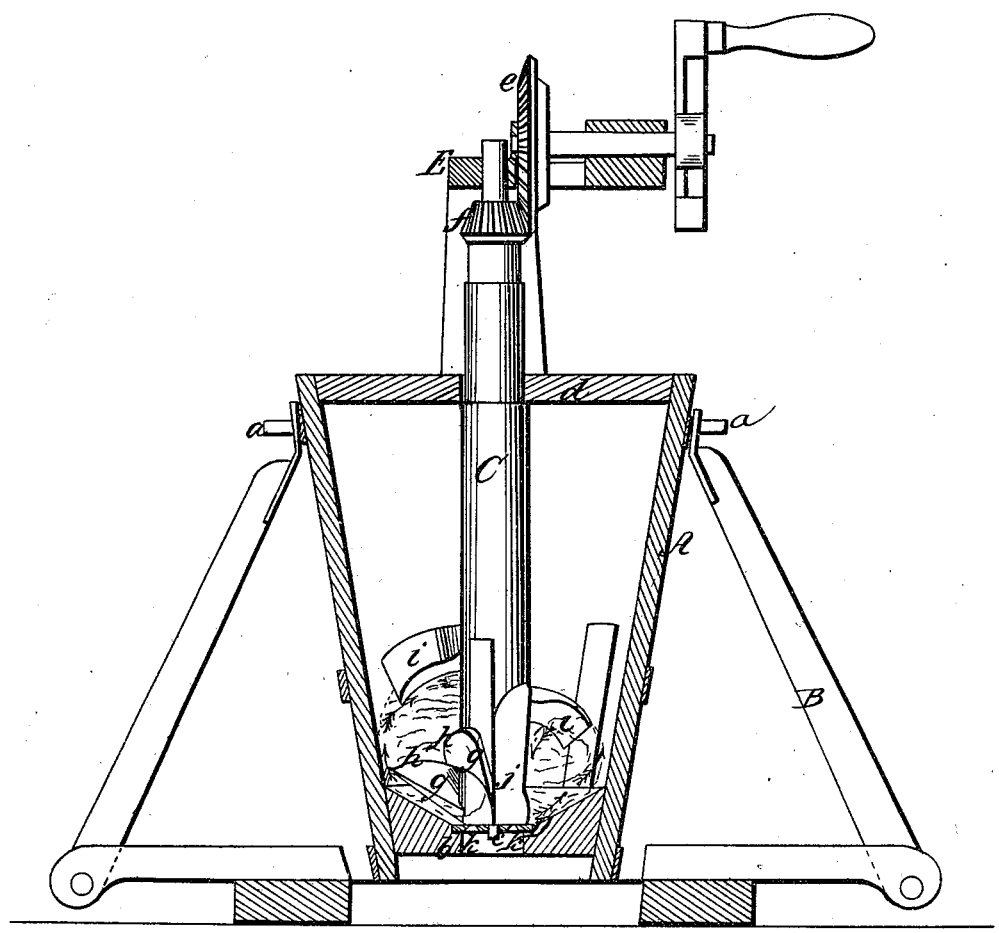

UNITED STATES PATENT OFFICE.

JUSTIN M. SMITH, OF LYME, CONNECTICUT.

BUTTER-WORKER.

Specification of Letters Patent No. 19,103, dated January 12, 1858.

*To all whom it may concern:*

Be it known that I, JUSTIN M. SMITH, of Lyme, in the county of New London and State of Connecticut, have invented a new and Improved Butter-Worker; and I do hereby declare that the following is a full, clear, and exact description of the same, reference being had to the annexed drawing, making a part of this specification, said drawing being a vertical section of the case of my improvement, the working parts not being bisected.

This invention consists in having a series of oblique arms attached to a vertical rotating shaft which is fitted within an inverted conical case provided with a perforated plate at its bottom, the parts being so arranged that the butter, without being subjected to any undue action, will, as the shaft is rotated, have all butter milk which it contains fully expressed from it.

To enable those skilled in the art to fully understand and construct my invention I will proceed to describe it.

A, represents the case of the implement which is of inverted conical form, and is suspended within a frame B, constructed in any proper manner so that the lower end of the case will be a short distance above the ground or floor as shown in the drawing. The case and frame may be constructed of wood, and the case A may be suspended in the frame on pivots (*a*) (*a*) so that it may be inverted when required in order to facilitate the removal of its contents.

C represents a vertical shaft, the lower end of which is stepped at the center of a metallic plate D fitted in the center of the bottom (*b*) of the case, as shown at (*c*). The shaft C passes up through the cover (*d*) of the case A, and has its upper bearing in an arched or bent plate E which is secured to the top of the case. The shaft C may be rotated by a direct application of power through the medium of a crank, or, multiplying gear (*e*) (*f*) may be used.

To the lower part of the shaft C, two arms or blades (*g*), (*g*), are attached. These arms or blades incline upward from the shaft at an angle of about 45°. The front edges of the arms or blades are curved as shown clearly at (*h*) (*h*) and are brought to a feather edge, the arms or blades being gradually tapered from their inner to their outer ends. One arm or blade (*g*) is placed a trifle above the other and the two project from the shaft at right angles with each other or, nearly so.

To the shaft C and at a certain distance above the arms or blades (*g*) two blades (*i*) (*i*) are attached. These blades project from the shaft C, nearly at opposite points, one being a short distance above the other. Both of the blades (*i*) (*i*) are curved downward and are placed in oblique positions as shown clearly in the drawing. The lower part of the shaft C, has a recess (*j*) formed in it at one side the use of which will be hereinafter shown.

The plate D, in the bottom (*b*) of the case is perforated with a suitable number of holes (*k*). These holes are counter sunk at the under side of the plate as shown clearly in the drawing and the upper surface of the bottom (*b*) is made of concave form.

The operation is as follows:—The butter is placed within the case A, and the shaft C rotated, and as the lower arms or blades (*g*) (*g*) project outward and upward from the shaft and the upper arms or blades (*i*) (*i*) project outward and downward from the shaft, the two sets of blades being inclined or replaced relatively in reverse oblique positions with each other, the butter will be forced around within the case A in the direction indicated by the arrows, the blades (*g*) forcing the latter upward and the blades (*i*) forcing it downward. By this operation the butter milk will be compressed from the butter and will pass down through the perforated plate D, the recess (*j*) affording a channel or passage for its ready escape. The holes (*k*) in the plate D, are countersunk in order to allow the butter milk to pass freely through them and prevent them from being clogged or choked.

By subjecting the butter to the rolling and compressing action as described, its grain or molecules will not be broken, for it is not subjected to a direct pressure, the working of the butter resembling that given or produced by hand, consequently the oily consistance which is given or imparted to butter by undue pressure is avoided.

It is a noticeable defect in all other butter-workers with which I am acquainted, that while they subject the butter to ample pressure, they present no means of simultaneously and uniformly mixing the mass. In my improvement, this highly important result is successfully obtained. The action of one set of arms is to press down the butter, while the other set lifts it; thus the mass is suitably pressed, while at the same time it is opened, rolled, spread out, and mixed over and over; every portion being subjected to a most thorough and uniform working. Indeed the machine can by no possibility be operated without acting equally upon every portion of the mass.

The employment of salt in the working of butter is of great importance, as it improves both the color and the flavor. But unless the salt is evenly mixed and interworked, its benefits are to a great extent lost. Other butter-workers are deficient in means for mixing in the salt. But my improvement accomplishes the work in the most effective manner. For the reasons before-named it is impossible for the salt to be introduced without being mixed and caused to penetrate every portion of the mass equally. The butter, therefore, when it comes from my machine, will be evenly salted throughout, and will be thereby caused to retain its good flavor. But when the salting is imperfectly done, the butter soon becomes rancid and acquires a bad taste. Salt has a tendency to assist in giving a rich golden color to butter. If the salting is thoroughly done, the butter will be of an even color throughout. But if the salting is imperfect, the butter will present the cloudy or streaky color—white and yellow—so often observed. The butter which comes from my machine always assumes the uniform golden-yellow color in every portion, without streak, spot, or blemish.

Another important point in my improvement is that when the working blades and apparatus are removed from the case or tub, the interior of the latter presents no holes, creases, or cracks, into which filth may gather and then escape removal during the cleansing operation. Perfect purity and cleanliness of the vessel and its parts is the first requisite of a good butter-worker.

Where rollers are employed, it is almost impossible to prevent the filling up of the bearings or spindles, with the material, and it is equally difficult to clean the same. No objection of this kind can be alleged against my machine, for the tub and operating parts are plain, present no crevices for the lodgment of "refuse," and may be conveniently and thoroughly cleaned.

A certain portion of the buttermilk is found by experience to harden or coagulate; and it has always been found difficult to remove this, either by hand or machine-working. But by the use of my improvement, the hardened particles are made to escape by the thorough opening and mixture to which the mass is subjected, and they are carried off by and with the buttermilk, in the most successful manner.

It will be observed that all such parts as hinges, arbors, and the like are dispensed with, in my improvement, and it is thereby rendered less liable to break or get out of order than other machines.

I do not claim broadly a rotating shaft placed within a case and provided with arms irrespective of the construction and arrangement of the arms and dependent parts as herein shown for such devices are in common use and may be seen in various churns and clothes washing machines; but,

Having thus described my invention, what I claim as new and desire to secure by Letters Patent, is,

The shaft C provided with arms or blades ($g$) ($g$) ($i$) ($i$) arranged as shown and placed within the inverted conical case A suspended within a proper framing and having a perforated plate D, fitted in its bottom ($b$), the whole being arranged substantially as and for the purpose set forth.

JUSTIN M. SMITH.

Witnesses:
DANIEL P. SMITH,
DANL. R. MAYES.